350-333 $$$ SR

E197Y OR 4,066,333

United States Patent

[11] 4,066,333

Dargent et al.

[45] Jan. 3, 1978

[54] METHOD OF CONTROL OF A LIQUID-CRYSTAL DISPLAY CELL

[75] Inventors: Bruno Dargent, Grenoble; Jacques Robert, Saint Egreve, both of France

[73] Assignee: Commissariat a l'Energie Atomique, Paris, France

[21] Appl. No.: 687,742

[22] Filed: May 18, 1976

[30] Foreign Application Priority Data

May 30, 1975 France .............................. 75.17050

[51] Int. Cl.[2] .......................... G02F 1/13; G08B 23/00

[52] U.S. Cl. .......................... 350/160 LC; 340/324 M

[58] Field of Search .................... 350/160 LC, 160 R; 340/324 R, 324 M; 358/59

[56] References Cited

U.S. PATENT DOCUMENTS

| | | | |
|---|---|---|---|
| 3,575,492 | 4/1971 | Nester | 350/160 LC |
| 3,655,269 | 4/1972 | Heilmeier | 350/160 R |
| 3,955,187 | 5/1976 | Bigelow | 340/324 M |
| 3,973,252 | 8/1976 | Mitomo | 340/324 M |
| 3,995,939 | 12/1976 | Borel | 350/160 LC |
| 4,011,008 | 3/1977 | Gerritsma | 350/160 LC |

FOREIGN PATENT DOCUMENTS

| | | |
|---|---|---|
| 2,223,753 | 10/1974 | France. |
| 2,223,754 | 10/1974 | France. |
| 1,372,720 | 11/1974 | United Kingdom. |

OTHER PUBLICATIONS

IBM Tech. Discl. Bull., Oct. 1973, vol. 16, No. 5, pp. 1578–1581.

IEEE Proceedings, vol. 59, No. 11, Nov. 1971, pp. 1566–1579.

Applied Physics Letters, vol. 19, No. 9, 1 Nov. 1971, pp. 343–345, 335–336.

Applied Physics Letters, vol. 25, No. 1, 1 July 1974, pp. 1–2.

Applied Physics Letters, vol. 25, No. 4, 15 Aug. 1974, pp. 186–188.

The Electronic Engineer, Nov. 1972, pp. 70–71.

RCA Review, vol. 35, Dec. 1974, pp. 613–650.

*Primary Examiner*—Samuel W. Engle
*Assistant Examiner*—Donald P. Walsh
*Attorney, Agent, or Firm*—Cameron, Kerkam, Sutton, Stowell & Stowell

[57] ABSTRACT

A display cell comprises a liquid-crystal film interposed between two groups of electrodes to which is applied a set of low-frequency voltages in order to produce an optical state "0" at desired points and a set of high-frequency voltages in order to produce an optical state "1" at other predetermined points. In the composite excitation applied to each zone, the low-frequency fraction of excitation exceeds the high-frequency fraction in the "0" display zones and the high-frequency fraction exceeds the low-frequency fraction in the "1" display zones.

5 Claims, 11 Drawing Figures

METHOD OF CONTROL OF A LIQUID-CRYSTAL DISPLAY CELL

This invention relates to a method of control of a liquid-crystal display cell and finds many applications in the field of optoelectronics, especially in the display of alphanumeric characters.

It is known that the phenomena of collective orientation of molecules can be obtained with certain liquid crystals. Some of these liquid crystals have a dielectric relaxation frequency at which the anisotropy of the molecules undergoes a change of sign. For example, the anisotropy is positive below this frequency and becomes negative above said frequency. When an electric field having a frequency below said critical frequency is applied to the liquid crystal, the long axis of the molecules is oriented in the direction of the field; but in the case of a frequency above said critical frequency, the short axis is oriented in the direction of the electric field. These two particular and different orientations of the molecules result in two different optical states of the liquid-crystal film, for example in two different values of the optical index of the liquid crystal film or in two different rotatory powers of said film.

The present invention is concerned with phenomena of this type and in a general manner with the liquid crystals which are capable, when subjected to an excitation resulting from the application of an electric field, of undergoing either a first molecular orientation when said electric field is at a first frequency which is lower than a critical value or a second molecular orientation when said electric field is at at second frequency which is higher than said critical value. This critical value is the dielectric relaxation frequency.

In the prior art, in order to control one of the two optical states of a liquid-crystal zone, for example the state corresponding to a first orientation, there is applied to said zone an electric field having a suitable frequency (lower than the dielectric relaxation frequency). Since this phenomenon exhibits an amplitude threshold, the voltages applied to the electrodes of the cell containing the liquid crystal are so adjusted that the resultant electrical excitation exceeds a critical solely in those zones in which it is desired to produce said state whilst the excitation applied in those zones in which it is desired that the liquid crystal molecules retain the second orientation remains lower than the threshold excitation. If the first optical state is designated symbolically as state "1" and the second optical state is designated as state "0", it can be stated that, in accordance with the control methods of the prior art, the display of "0" in fact results from an excitation which is insufficient to produce the state "1".

Control methods of this type are subject to at least two disadvantages: the contrast and the angle of view of the displayed image are of low value and the image-changing or erasing time is of long duration.

The precise aim of the present invention is to provide a method of control for a liquid-crystal display cell which overcomes these disadvantages. To this end, when it is desired to ensure that an optical state "1" is not displayed in certain zones of the liquid crystal, it is found preferable not to apply in these zones an excitation which is insufficient to cause the appearance of said "1" state therein as in the prior art but to apply an excitation which is capable of producing the state "0" and conversely. The contrast is then improved between the liquid crystal zones which are in the optical state "1" and the adjacent zones in the optical state "0". Moreover, when the state of a zone changes from "1" to "0" at a time of a change in the displayed image, the time of transition from the first state to the second is much shorter than in the prior art.

Since all the excitation signals which are intended to produce the two states "1" and "0" have different frequencies (which lie on each side of the critical frequency), the two types of signals can be superimposed, one of the two signals being predominant with respect to the other. In other words and in accordance with the invention, the excitation to which the liquid crystal is subjected in order to ensure that a full image is displayed is composite insofar as it comprises one portion which is capable of producing one of the two optical states and another portion which is capable of producing the other optical state, the relative values of these two excitations being adjusted so as to obtain the desired optical state in each zone of the imager.

In more exact terms, the invention relates to a method of sequential control of a liquid crystal display cell comprising a liquid crystal film interposed between a first group of electrodes and a second group of electrodes, overlapping of one electrode of the first group by one electrode of the second group being such as to define an excitable zone of the liquid crystal film. Said liquid crystal has dielectric anisotropy and a critical frequency at which said dielectric anisotropy undergoes a change of sign, the value of anisotropy being $\epsilon_1$ below the critical frequency and $\epsilon_2$ above said critical frequency. Said liquid crystal is capable of assuming a first optical state or so-called state "0" corresponding to a first orientation of its molecules when subjected to an alternating electric field at a low frequency below said critical frequency and being capable of assuming a second optical state or so-called state "1" corresponding to a second orientation of its molecules when subjected to an alternating electric field at a high frequency above said critical frequency. Said method is distinguished by the fact that:

- a first set of low-frequency selective-display voltages is applied to the electrodes of the first and second groups and capable of producing the "0" state at the desired points,
- a second set of high-frequency selective-display voltages is also applied to the electrodes of the first and second groups and capable of producing the state "1" at the other points,
- the low-frequency and high-frequency voltages applied are so adjusted that, in the composite excitation applied to each zone, the low-frequency fraction of excitation exceeds the high-frequency fraction of excitation in the zones in which it is desired to display the "0" state and to ensure that the high-frequency excitation fraction exceeds the low-frequency excitation fraction in the zones in which it is desired to display the state "1".

Methods for controlling liquid-crystal display cells are already known in which use is made, for example, of a low frequency which is intended for display and a high frequency which is intended for erasure. In this connection, reference may be made to the article entitled "Liquid-Crystal Matrix Displays" by B. J. Lechner et al., published in "Proceedings of the I.E.E.E.", volume 59, No. 11, November 1971, page 1566 and in U.S. Pat. No. 3,575,492 of Apr. 20th, 1971. The method according to the present invention is distinguished from the prior methods in that the signals for excitation at the two different frequencies cooperate at each point of the cell so as to determine the optical state displayed whereas, in the prior art, the excitations at different frequencies succeed each other and the second destroys the effect of the first.

In other words and as will be more readily understood from the following description, neither of the two states "0" or "1" which can be assumed by the liquid crystal is obtained by a neutral excitation as in the prior art; the two states are in fact induced states caused in one case by a low-frequency excitation and in the other case by a high-frequency excitation. In any one zone, when a low-frequency excitation which is capable of causing the appearance of a "0" state is in competition with a high-frequency excitation which has an oppositely-acting effect since it has a tendency to cause the appearance of a "1" state, the two types of excitations are adjusted so that one of these latter exceeds the other in order to ensure that the desired state is correctly displayed. In accordance with the invention, two sets of voltages are accordingly applied to the electrodes, one set being capable of inducing "0" states at certain points and the other being capable of inducing "1" states at the other points. Thus, when it is desired to pass a liquid-crystal zone from a "1" state to a "0" state, it is not considered sufficient to reduce the excitation as in the prior art but said state "0" is caused to be established and the time of transition from "1" to "0" is considerably reduced as a result.

In the foregoing definition of the method according to the invention, the two types of cooperating sequential excitations at different frequencies are not necessarily applied simultaneously to the liquid crystal but can be applied simultaneously at least to a partial extent.

In the event that the liquid crystal cell is of the imager type formed by a matrix of points defined by the points of overlap of the electrodes of a first group with electrodes of a second group, the control is carried out on an electrode of the first group after an electrode of the first group, all the points defined by any one electrode of the first group being controlled simultaneously by applying a control voltage to said electrode and at the same time by applying a control voltage to all the electrodes of the second group; adjustment of the relative values of the excitations applied simultaneously at the points defined by any one electrode of the first group is carried out by adjusting the RMS values of the voltages applied to the electrodes of the second group and to said electrode of the first group.

In a preferred alternative embodiment, the electrodes of the first group are disposed in columns and the electrodes of the second group are disposed in lines.

In another alternative embodiment, the electrodes of the first group are plates and the electrodes of the second group are segments placed opposite to each plate.

It can be pointed out that there are known liquid-crystal display cells in existence which operate in the dynamic scattering mode (DSM effect) and not in the collective molecular orientation mode. However, the teachings relating to the DSM effect cannot readily be transposed to the orientation effect since the two phenomena employed are essentially different (turbulent motions in the first case and effect of an electric field on a dielectrically anisotropic molecule in the other case). In particular, the behavior of the liquid crystal after discontinuance of the excitation which governs the decay time of the phenomenon is very different in DSM and in field effect. In DSM, the decay time is always the natural decay time $T_N$. In field effect, this time $T_D$ is a function of the residual voltage V:

$$T_D = T_N \frac{V_s^2}{V^2 - V_s^2}$$

where $V_S$ is the threshold voltage as will be explained hereinafter.

The characteristic features and advantages of the invention will in any case become more clearly apparent from the following description of exemplified embodiments which are given by way of explanation without any limitation being implied, reference being made to the accompanying drawings, wherein:

FIG. 1 shows diagrammatically a system of electrodes of the crossed strip type and illustrates a first known method of control of a crossed-strip display cell;

FIG. 2 also shows a crossed-strip system and serves to illustrate another known method of control of a crossed-strip display cell;

Figure 1:
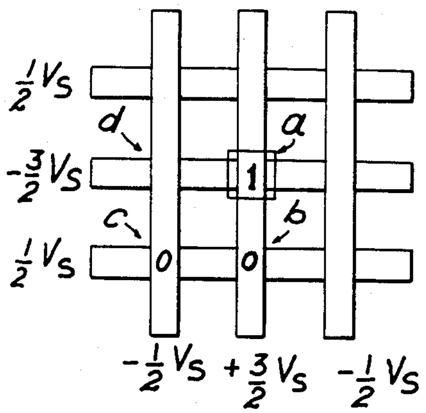

It is known that the orientation phenomena produced by the application of an electric field to a liquid crystal vary in time with a constant T having a value:

$$\frac{1}{T} = \frac{\epsilon}{4\pi L^2 \gamma}(V^2 - V_S^2) \quad (1)$$

where V is the control voltage, $V_S$ is the threshold voltage of the electrooptical effect, $\gamma$ is a coefficient of viscosity of the liquid crystal, $\epsilon$ is the dielectric anisotropy of the liquid crystal at the excitation frequency, L is the thickness of the liquid-crystal film.

The natural decay time $T_N$ of the effect is obtained when the control voltage V is zero, that is:

$$\frac{1}{T_N} = \frac{-\epsilon V_S^2}{4\pi L^2 \gamma} \quad (2)$$

The decay time T is therefore related to the natural decay time $T_N$ by the following relation:

$$T = T_N \frac{V_S^2}{V_S^2 - V^2} \qquad (3)$$

which can also be written:

$$T = T_N \frac{\epsilon_1 V_S^2}{\epsilon_1 V_S^2 - \epsilon_1 V^2} \qquad (4)$$

As a result of formula (3), the time of transition from a given state to the state produced by application of a voltage V increases when the applied voltage V comes close to the threshold voltage. Theoretically and in the extreme case, when the applied voltage is equal to the threshold voltage $V_S$, the decay time becomes infinite; (in this case, however, formula (3) would not longer be strictly valid since the decay becomes hyperbolic and no loger exponential).

It is therefore found that the time taken to pass from a first state having the symbolical notation "1" and obtained in the case of an applied voltage which is higher than the threshold voltage to a second state having the symbolical notation "0" and obtained in the case of a voltage which is very slightly lower than the threshold voltage is of very long duration and considerably in excess of the natural decay time. The ratio between these two time intervals can be of the order of 10:1, for example.

Figure 2:
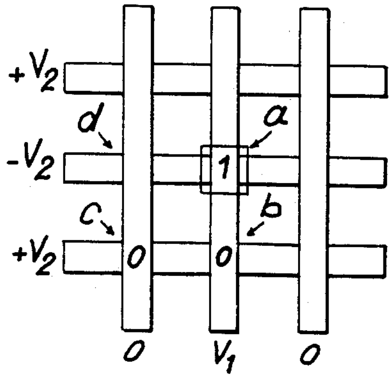

In point of fact, this is precisely the situation encountered in the methods of control of the prior art as can be verified by studying two of these methods with reference to FIGS. 1 and 2.

There is shown in FIG. 1 a system of crossed-strip electrodes which is limited to three lines and three columns. In order to initiate the display of a "1" in the zone designated as *a*, voltage $+ 3/2\ V_S$ is applied to the column corresponding to said zone and a voltage $- 3/2\ V_S$ is applied to the line corresponding to said zone. Voltages equal to $- \frac{1}{2} V_S$ are applied to the other columns and voltages equal to $\frac{1}{2} V_s$ are applied to the other lines. Since the applied signals are alternating-current signals having a zero means value, the sign "+" corresponds to a given phase and the signal "−" corresponds to the opposite phase. Such a set of voltages will be designated hereinafter as the system A. The excitation voltage in the zone *a* is equal to three times the threshold voltage and the voltages at the points *b, c, d* and so forth are equal to the threshold voltage.

This system has been chosen since it makes it possible to apply the maximum voltage to the excited point and therefore to obtain the maximum writing speed and because it applied to the non-displayed or non-sensitized points a voltage which is either lower than or equal to the threshold voltage. The major disadvantage of a system of this type therefore clearly lies in the fact that, in order to pass at one point from a "1" to a "0" at the time of a change of image, it is necessary to wait for a very long time. Thus, when a first image has been indicated and when it is desired to display a second image, a very long period of time must be allowed to elapse in order to ensure that the residual excitations do not disturb the new image.

In the case of such very long decay times, the molecules never return exactly to their position of rest and this has a tendency to reduce the display contrast. This effect is particularly marked when the number of columns of the imager or the number of characters of the display device is substantial.

Another set of voltages which is also known in the prior art is that of the system B of FIG. 2: a voltage $V_1$ is applied to the column corresponding to the zone *a* in which it is desired to produce a "1" and a voltage $-V_2$ is applied to the line corresponding to said zone. A zero voltage is applied to the other columns and a voltage $+V_2$ is applied to the other lines. The excitation voltage within the zone *a* is then equal to $V_1 + V_2$ and is only $V_1 - V_2$ at the point *b*. In this case also, the voltages $V_1$ and $V_2$ are so adjusted that the mean value of the RMS voltage applied during the period of an image for the display of a "0" is smaller than or equal to $V_S$.

In connection with these two systems A and B of voltages applied to the lines and the columns of an imager, it can be pointed out that they are in fact reduced to a single system. Thus if a voltage $+\frac{1}{2}V$ is added to the set of voltages A $(+\frac{1}{2}V, -3/2V, +\frac{1}{2}V)$ applied to the lines of an imager, the set of voltages B $(+V, -V, +V)$ is accordingly obtained. Similarly, if the same quantity $+\frac{1}{2}V$ is added to the set of voltages A $(\frac{1}{2}V, +3/2V, -\frac{1}{2}V)$ applied to the columns, the set of voltages B (0.2V, O) is accordingly obtained. It can therefore be stated that there is a transition from system A to system B by means of a translation of $\frac{1}{2}V$.

The methods of control of the prior art in which the display of "0" is obtained by applying a voltage which is slightly lower than or equal to the threshold voltage therefore have a double disadvantage in that they result in a very long image change and in poor contrast. This also holds true if, as in the foregoing description, the display is carried out point by point or if it is carried out column by column in accordance with frequent practice, in which case the excitations corresponding to the "0's" and to the "1's" of each column are applied simultaneously and assume the same values as those indicated in the figures ($-3/2V_S$ in the case of a "1", $\frac{1}{2} V_S$ in the case of a "0" in FIG. 1; $-V_2$ in the case of a "1", $V_2$ in the case of a "0" in FIG. 2). The method of control according to the invention overcomes these disadvantages as will now be explained.

In the case of a liquid crystal which is subjected to the collective molecular orientation mode, it is known that the electric excitation resulting from superimposition of a low-frequency voltage and a high-frequency voltage is proportional to an expression F which has the value:

$$F = \epsilon_1 V_{BF}^2 - \epsilon_2 V_{HF}^2 - \epsilon_1 V_S^2 \qquad (5)$$

wherein:

$\epsilon_1$ is the dielectric anisotropy at low frequency, $\epsilon_2$ is the dielectric anisotropy at high frequency, $V_{BF}$ is the RMS value of the voltage at a first frequency below the dielectric relaxation frequency at which the anisotropy falls to zero and which is designated hereinafter as the low-frequency voltage, $V_{HF}$ is the RMS value of the voltage at a second frequency which is higher than said relaxation frequency and designated hereinafter as the high-frequency voltage, $V_S$ is the low-frequency threshold voltage.

For the proof of this expression, reference may be made for example to the article by H. K. Bucher et al. entitled "Frequency-addressed liquid-crystal field effect" published in the "Applied Physics Letters" review, volume 25, No 4 of Aug. 15th, 1974, page 186 and to the article by T. S. Chang published in "Applied Physics Letters", volume 25, No 1, July 1st, 1974, page 1.

Relation (5) given above serves to define a voltage $V_{eq}$ which is equivalent to the application of said low-frequency and high-frequency voltages insofar as it would produce the same excitation.

This equivalent voltage $V_{eq}$ is such that:

$$F = \epsilon_1 V_{eq}^2 - \epsilon_1 V_S^2 \quad (6)$$

In order to determine the characteristics of excitation applied to the liquid crystal in accordance with the method of control contemplated by the invention, it is therefore necessary to calculate the expression F as a function of the voltages applied to the different electrodes.

These voltages result from the superimposition of a first set of voltages at low frequency which can either be of type A illustrated in FIG. 1 or of type B illustrated in FIG. 2 and which is intended to produce the state "1" and of a second set of voltages at high frequency which can also be either of type A or of type B and intended to produce the state "0" at the other points of the imager. One of four types of sets of composite voltages can therefore be present, depending on whether:

1. The sets of low-frequency and high-frequency voltages are both of type A;
2. The set of low-frequency voltages is of type A and the set of high-frequency voltages is of type B;
3. The set of low-frequency voltages is of type B and the set of high-frequency voltages is of type A;
4. The sets of low-frequency and high-frequency voltages are both of type B.

Figure 3:
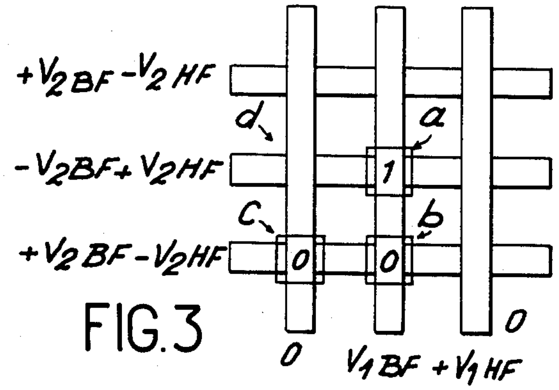
FIG. 3 shows a crossed-strip system and illustrates the method of control according to the invention.

By way of explanation, FIG. 3 represents a system of electrodes consisting of crossed strips and illustrates the application of the method in accordance with the fourth alternative embodiment in which the two sets of low-frequency and high-frequency voltages are of type B. In accordance with this method, a voltage $V_{1BF} + V_{1HF}$ is therefore applied in order to produce a state "1" in the zone *a* to the column corresponding to said zone, $V_{1BF}$ being such as to designate the RMS value of the low-frequency voltage and $V_{1HF}$ being such as to designate the RMS value of the high-frequency voltage; zero voltages are applied to the other columns. A composite voltage of the form $-V_{2BF} + V_{2HF}$ is applied to the line corresponding to the zone *a* and a voltage of the form $V_{2BF} - V_{2HF}$ is applied to the other lines, using the same conventional signs as in FIGS. 1 and 2.

By employing such a set of voltages, the following voltages are obtained in respect of the different zones:

| | |
|---|---|
| Zone a | : $(V_{1BF} + V_{2BF}) + (V_{1HF} - V_{2HF})$ |
| Zone of type b | : $(V_{1BF} - V_{2BF}) + (V_{1HF} + V_{2HF})$ |
| Zone of type c | : $-V_{2BF} + V_{2HF}$ |
| Zone of type d | : $V_{2BF} - V_{2HF}$ |

According to the definition given in formula (6), the equivalent voltage applied to the zones *a* in which a "1" is displayed, said voltage being given the notation $V_{eq}$ (1), is given by:

$$\epsilon_1 V_{eq}^2 (1) = \epsilon_1 (V_{1BF} + V_{2BF})^2 - \epsilon_2 (V_{1HF} - V_{2HF})^2 \quad (7)$$

in the case of the zones such as *b* in which it is desired to display a "0", the equivalent voltage $V_{eq}$ (0) is given by:

$$\epsilon_1 V_{eq}^2 (0) = \epsilon_1 (V_{1BF} - V_{2BF})^2 - \epsilon_2 (V_{1HF} + V_{2HF})^2 \quad (8)$$

Thus, in each zone of the liquid crystal which is excited in accordance with the method of control of the invention, part of the excitation corresponds to the low-frequency signals and another part corresponds to the high-frequency signals. In order to ensure that the state displayed at the point *b* is in fact "0", it must be ensured that the contribution of the low-frequency signals to the excitation is smaller than that of the high-frequency signals and that the following inequality is satisfied:

$$\epsilon_1 (V_{1BF} - V_{2BF})^2 \leqq \epsilon_2 (V_{1HF} + V_{2HF})^2 \quad (9)$$

or, equivalently, that the quantity $\epsilon_1 V_{eq}^2 (0)$ defined by formula 8 must be negative. Should this be the case, the decay time given by formula (4) becomes shorter than the natural decay time $T_N$.

In other words, it follows from condition (9) not only that the "1's" and the "0's" are correctly displayed at the suitable points but also that the return to a state "0" is induced and that the duration of such a return is considerably reduced in comparison with the prior art.

The foregoing considerations hold true for the control of the zones which form part of a single column of an imager. However, it is known that a liquid-crystal imager can consist of a plurality of columns. An imager of this type can be controlled by sequential application of voltages to the columns and simultaneous application of voltages to the lines. In this case, each zone of the liquid crystal is excited not only by the signals resulting from the application of voltages to the column to which said zone belongs but also by the parasitic signals resulting from the application of voltages to adjacent columns. In the case of column-by-column multiplexing of this type, a zone displayed at "1" stores during scanning of a total image, on the one hand an excitation equal to that which is applied to the zone of type *a* of FIG. 3 and, on the other hand, $(k - 1)$ parasitic excitations which are inherent to the zones of type *d* if k designates the number of columns of the imager. In the case of the method of control according to the invention, these excitation energy storage phenomena can also be defined quantitatively by means of the expression F of relation (5). The expression F (1) representing the excitation stored in a zone displayed as "1" is of the form:

$$F(1) = \epsilon_1 (V_{1BF} + V_{2BF})^2 - \epsilon_2 (V_{1HF} - V_{2HF})^2 + (k - 1)(\epsilon_1 V_{2BF}^2 - \epsilon_2 V_{HF}^2) - \epsilon_1 V_S^2 \quad (10)$$

In regard to the expression F (0) which characterizes the excitation stored during total scanning of the image in a zone displayed as "0", said expression is of the form:

$$F(0) = \epsilon_1 (V_{1BF} - V_{2BF})^2 - \epsilon_2 (V_{1HF} + V_{2HF})^2 + (k - 1)(\epsilon_1 V_{2BF}^2 - \epsilon_2 V_{2HF}^2) - \epsilon_1 V_S^2 \quad (11)$$

These expressions show that, in the case of the above-mentioned column-by-column sequential control, the excitation stored at each point of the liquid-crystal film comprises a first fraction derived from the application of low-frequency voltages to the electrodes and a second fraction derived from the application of high-frequency voltages to the same electrodes. In order to obtain the state "0" at certain points, the RMS values of the applied voltages are adjusted so as to ensure that said second fraction of the stored excitation derived from the application of high-frequency voltages is larger at these points than the first fraction of the stored excitation derived from the application of the low-frequency voltages. This condition satisfies the following inequality:

$$\epsilon_1 (V_{1BF} - V_{2BF})^2 + (k-1)\,\epsilon_1 V_{2BF}^2 < \epsilon_2 (V_{1HF} + V_{2HF})^2 + (k-1)\,\epsilon_2 V_{2HF}^2 \qquad (12)$$

If this inequality is satisfied, the expression $\epsilon_1 V_{eq}^2(0)$ given by the expression:

$$\epsilon_1 V_{eq}^2(0) = \epsilon_1 (V_{1BF} - V_{2BF})^2 - \epsilon_2 (V_{1HF} + V_{2HF})^2 + (k-1)(\epsilon_1 V_{2BF}^2 - \epsilon_2 V_{2HF}^2) \qquad (13)$$

is negative, which means in accordance with relation (4) and as in the case of control of a single column, that the time taken by the liquid crystal to pass from a state displayed as "1" to a state "0" is shorter than the natural decay time.

Figure 4:
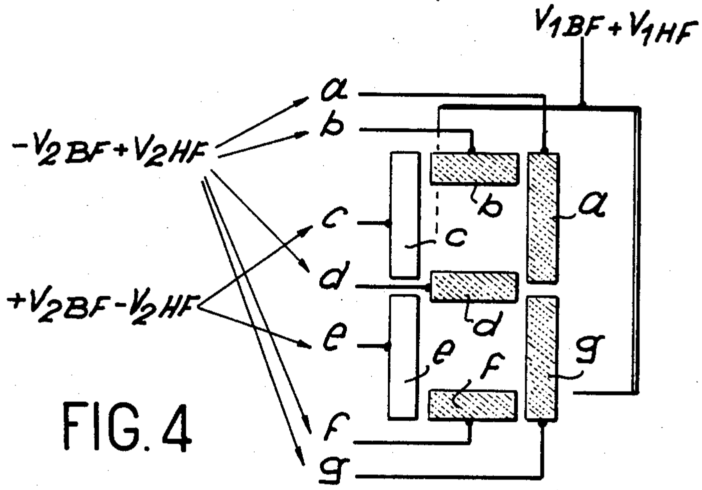
FIG. 4 shows a system of electrodes in the form of segments for the display of a numeric character and illustrates the method of control according to the invention as applied to a cell of this type.

The method of control according to the invention is naturally not limited to the control of imagers in which the electrodes are in the form of crossed strips but applies more generally to all imagers in which the points are excited by coincidence of excitation on two electrodes irrespective of the shape of these latter. In particular, it is possible by means of the method in accordance with the invention to control imagers for the display of numeric characters, said imagers being constituted in known manner by transparent conductive segments placed opposite to a conductive plate. This is shown in FIG. 4.

In this case, the control can be performed by applying a voltage of the form $V_{1BF} + V_{1HF}$ to the plate of the cell for the display of a character and by applying to the segments either a voltage $- V_{2BF} + V_{2HF}$ when it is desired to obtain the state "1", or a voltage $+ V_{2BF} - V_{2HF}$ when it is desired to obtain the state "0". In FIG. 4, a particular case is shown in which the numeral 3 is displayed by means of the excitation of a state "1" on the segments *a, b, d, g, f,* and by means of the excitation of a state "0" on the segments *c* and *e*. In the case of an imager constituted by a plurality of cells for the display of a character, the multiplexed control is performed by applying the voltages to the plates sequentially, character after character, and simultaneously on the segments.

After having described the method of control according to the invention in its most general aspect, particular cases will now be contemplated in order to give a clearer definition of the performances obtained by means of an imager which is controlled in this manner.

The inequality (12) which is the condition to be satisfied by the RMS values of the voltages applied to the strips of an imager in order to ensure that the decay time is shorter than the natural decay time assumes a simplified form in the particular case in which the voltages $V_{2BF}$ and $V_{2HF}$ satisfy the relation:

$$\epsilon_1 V_{2BF}^2 = \epsilon_2 V_{2HF}^2 \qquad (14)$$

In this case, the terms containing the factor $(k - 1)$, in fact disappear, with the result that the condition in regard to the voltages and consequently the performances obtained become independent of the number of columns and therefore of the complexity of the imager.

In the particular case in which relation (14) is satisfied, the inequality (12) takes the form:

$$\epsilon_1 (V_{1BF} - V_{2BF})^2 \leqq \epsilon_2 (V_{1HF} + V_{2HF})^2 \qquad (15)$$

and the equivalent control voltage $V_{eq}$ is expressed by:

$$V_{eq}^2 = (V_{1BF} + V_{2BF})^2 - (\epsilon_2/\epsilon_1)(V_{1HF} - V_{2HF})^2 \qquad (16)$$

It is advantageous to give the highest possible value to this voltage in order to increase the contrast. If the high-frequency voltage $V_{1HF}$ is considered as a parameter, the formula (16) indicates that the equivalent control voltage is of maximum value when $V_{1HF} = V_{2HF}$. The equivalent control voltage obtained in this case has the value:

$$V_{eq}^2 = (V_{1BF} + V_{2BF})^2 \qquad (17)$$

The inequality (15) is written in this particular case:

$$V_{1BF} \leqq 3 V_{2BF} \qquad (18)$$

Thus, a knowledge of the voltage $v = V_{2BF}$ makes it possible to determine all the other voltages by means of the following particular relations:

$$V_{1HF} = v\sqrt{\frac{\epsilon_1}{\epsilon_2}}$$

$$V_{2HF} = v\sqrt{\frac{\epsilon_1}{\epsilon_2}}$$

$$V_{1BF} \leqq 3\,v \qquad (19)$$

If $V_{1BF} = 3\ V_{2BF}$ is chosen, for example, the time of transition from state "1" to state "0" is in that case the natural decay time of the liquid crystal.

If $V_{1BF} = 2\ V_{2BF}$ is chosen, the decay time assumes the value j $$T = \frac{V_S^2}{(3\ V_{2BF})^2 + V_S^2}\, T_N \qquad (20)$$

In particular, if the voltage $V_{2BF}$ is equal to the threshold voltage $V_S$, the decay time T given by the relation (20) is four times smaller than the natural decay time and the applied RMS voltage is equal to 3 $V_S$.

As a general rule, it is possible to choose a low-frequency voltage $V_{2BF}$ having a value as high as may be desired, thus having the effect of increasing the control voltage and reducing the decay time. For example, if the value chosen is $V_{1BF} = 2.5\ V_{2BF}$ and it is sought to have a decay time which is four times shorter than the natural decay time, the value adopted will be $V_{2BF} = 1.3\ V_S$ and the control RMS voltage will in that case be 4.6 $V_S$.

Another particular case of the general relations (15) and (16) is that in which the following relation is satisfied:

$$\epsilon_1 V_{2BF}^2 - \epsilon_2 V_{2HF}^2 = \epsilon_1 V_S^2 \qquad (21)$$

In this case, the expression (12) is written:

$$\epsilon_1 (V_{1BF} - V_{2BF})^2 - \epsilon_2 (V_{1HF} + V_{2HF})^2 + (k-1)\,\epsilon_1 V_S^2 < 0 \qquad (22)$$

the expression (13) which gives the equivalent voltage becomes :

$$\epsilon_1 V_{eq}^2 = \epsilon_1 (V_{1BF} + V_{2BF})^2 - \epsilon_2 (V_{1HF} - V_{2HF}) \quad (23)$$

This equivalent voltage is of maximum value when $V_{1HF} = V_{2HF}$, and it then assumes the following value:

$$V_{eq} = V_{1BF} + V_{2BF} \quad (24)$$

In this particular case, the inequality (22) is written:

$$(V_{1BF} + V_{2BF})(V_{1BF} - 3 V_{2BF}) + (k + 3) V_0^2 < 0 \quad (25)$$

which entails $$V_{2BF} > V_S \sqrt{\frac{k+3}{4}}$$

$$V_{1BF} < V_{2BF} + \sqrt{4 V_{2BF}^2 - (k+3) V_S^2} \quad (26)$$

and the equivalent voltage $V_{eq}(0)$ for the control of a zero takes the value:

$$V_{eq}^2(0) = (V_{1BF} + V_{2BF})(V_{1BF} - 3 V_{2BF}) + (k + 3) V_S^2 \quad (27)$$

By way of example, in the case of an imager comprising $k = 5$ columns, it follows from the relations (26) that:

$$V_{2BF} > V_S \sqrt{2}$$

In the case of $V_{2BF} = 1.6\ V_S$ there will be obtained $$V_{1BF} < 3.1\ V_S$$

In the case of $V_{1BF} = 2.8\ V_S$ there will be obtained $V_{eq} = 4.4\ V_S$ and $T = 0.1\ T_N$.

It is in fact found in this further particular case that the contrast is improved in comparison with the methods of the prior art since the RMS voltage is higher than $3\ V_S$ and the image-changing time is considerably reduced since it is ten times shorter than the natural decay time.

Figure 5:
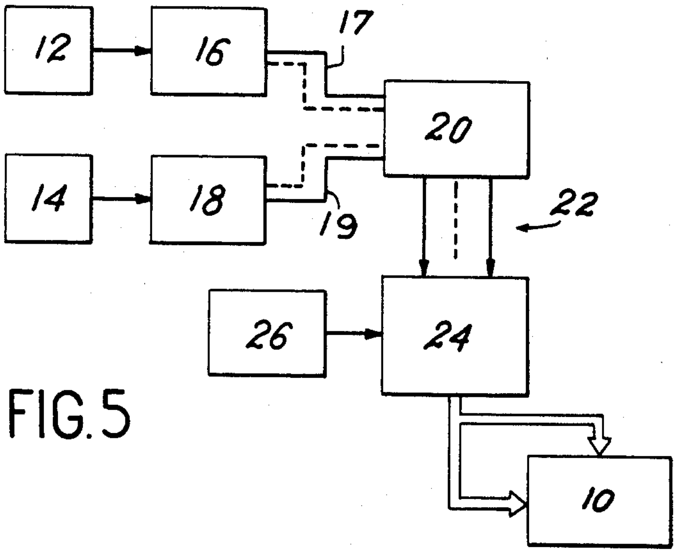
FIG. 5 is a general arrangement diagram of a device which makes it possible to employ the method according to the invention.

The control device of a liquid-crystal display cell for carrying out the method which has just been described is shown diagrammatically in FIG. 5.

In this figure, the display cell to be controlled is designated by the reference 10. The control device comprises schematically a first generator 12 at a first frequency below the critical value which characterizes the liquid crystal and a second generator 14 at a second frequency which is higher than said critical value. The two generators 12 and 14 are connected respectively to circuits 16 and 18 for adjusting the RMS value of the electric voltages at the corresponding frequencies. The circuit 16 delivers a first set of low-frequency voltages on its lead 17 and the circuit 18 delivers a second set of high-frequency voltages on its output lead 19. Means 20 are connected to the circuits 16 and 18 and deliver a third set of voltages carried by the leads 22, said voltages being the result of the superimposition of a voltage of the first set and a voltage of the second set. Addressing means 24 connect the electrodes of the display cell 10 to the circuit 20. These addressing means are controlled by units 26 which are well known to those versed in the art.

Figure 6:
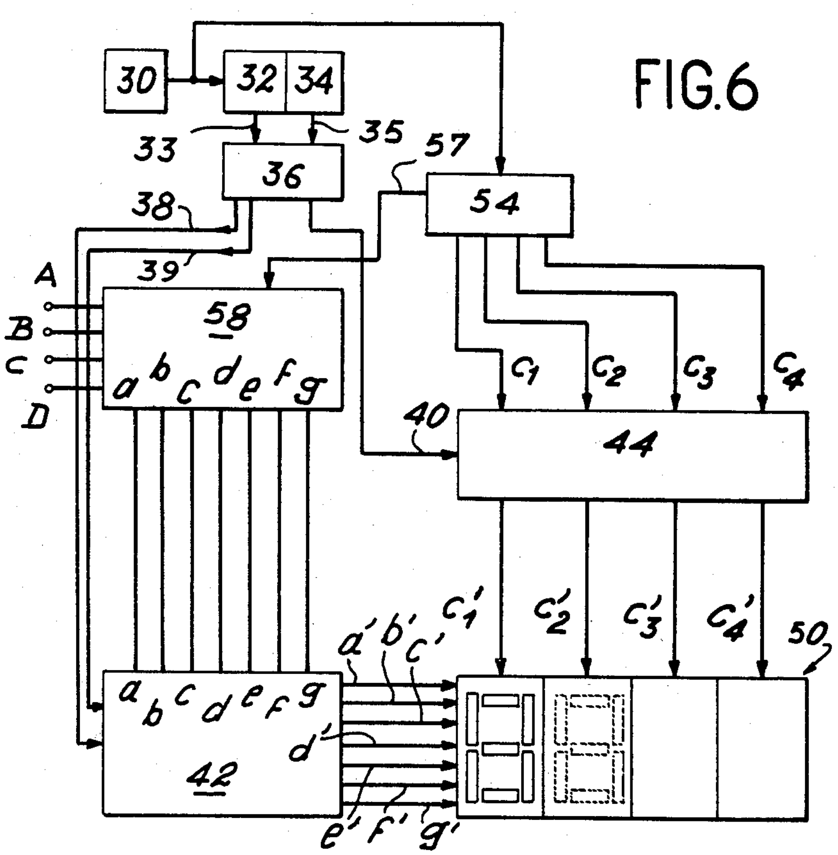
FIG. 6 is a block diagram of a device for controlling an imager constituted by four cells for the display of a numeric character.

FIG. 6 is a schematic diagram of a device in accordance with the invention for the control of a liquid-crystal device constituted by four cells for displaying a character, each cell being of the type comprising seven segments. Said control device comprises a clock 30, two frequency generators 32 and 34 for producing low frequency and high frequency respectively and delivering low-frequency and high-frequency voltages respectively on the leads 33 and 35. A circuit 36 forms a set of composite voltages carried by the leads 38, 39 and 40. These voltages are applied to two interface circuits 42 and 44 respectively. The first of these circuits controls all the segments of the different display cells of one character of the imager 50 and the second interface circuit controls sequentially the display of each character. The addressing leads relating to the seven segments are designated by the references *a, b, c, d, e, f, g* and the addressing leads relating to the four characters of the imager are designated by the references $C'_1$, $C'_2$, $C'_3$ and $C'_4$. The sequential control of the imager 50 is determined by a shift register 54, the four output leads of which are designated as $C_1$, $C_2$, $C_3$ and $C_4$. A decoding circuit 58 receives at its four inputs A, B, C and D the signal corresponding to the characters to be displayed on the four cells of the display device. This decoding circuit emits binary signals which are carried by the output leads *a, b, c, d, e, f* and *g* and directed towards the leads *a', b', . . . g'* which are connected to the seven segments of each display cell. The circuit 58 is controlled by the shift register 54 and connected to this latter by means of the lead 57.

The operation of this circuit is as follows: the circuit 36 which will be described in greater detail hereinafter delivers on the lead 40 a composite voltage of the form $V_{1BF} + V_{1HF}$, for example, which is continuously directed to the circuit 44; the circuit 36 delivers a voltage $V_{2BF} - V_{2HF}$ on the lead 38 and a voltage $- V_{2BF} + V_{2HF}$ on the lead 39. These two voltages are continuously applied to the circuit 42.

The number to be displayed on the liquid-crystal device which is a four-figure number in the case of FIG. 6 is coded in decimal binary notation, for example, in which case each figure corresponds to a set of three binary digits applied to one of the four leads A, B, C, D. For example, should it be desired to display the number 1937, the first character is sensitized and 0 is applied to A, 0 to B, 0 to C, 1 to D; the second character is then sensitized and 1 is applied to A, 0 to B, 0 to C, 1 to D, then the third character and 0 is applied to A, 0 to B, 1 to C, 1 to D, then the fourth character and 0 is applied to A, 1 to B, 1 to C, 1 to D. Since 0001 corresponds to 1,1001 corresponds to 9,0011 to 3 and 0111 to 7.

Since the leads *a', b', c', . . . g'* are connected to all the segments of the display device, it is necessary to apply the voltage $V_{1BF} + V_{1HF}$ only on the appropriate plate of the display cell, for example the third plate in the case of display of the "3"; in other words, only the lead $C'_3$ must be connected to the lead 40 when the leads *a', b' . . . g'* are brought to the potentials corresponding to the numeral "3". This connection is established by means of the circuit 44 which will be described in detail with reference to FIG. 10. Synchronization between plate signals and segment signals is carried out by the shift register 54 which initiates the change of character by producing action on the one hand on the decoder 58 via the lead 57 and on the other hand on the circuit 54 by determining the particular connection $C'_1 \ldots C'_4$ which is intended to be connected to the lead 40. The shift register 54 is controlled by the clock 30 which emits a pulse train, thereby progressively shifting the logical state of the cells which constitute said register. At the same time, the frequency of said pulse train is divided by the circuits 32 and 34 in order to obtain said high and low frequencies.

Figure 8:
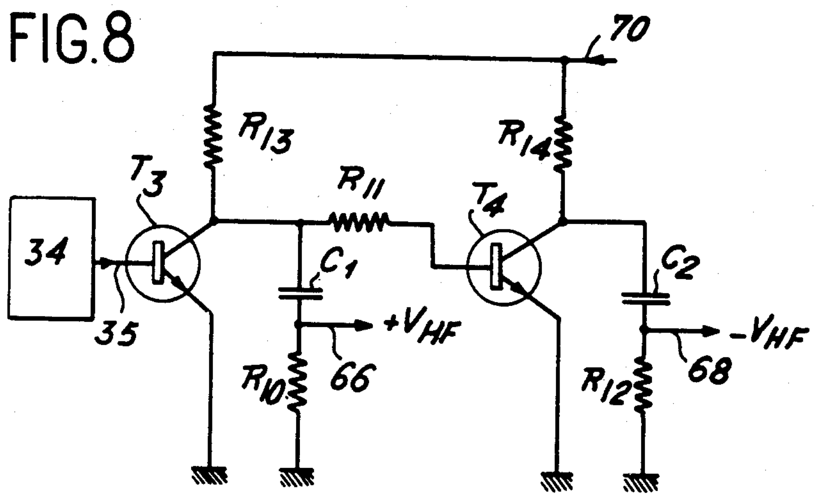
FIG. 8 is an electronic circuit diagram for obtaining voltages having suitable RMS values from a low-frequency signal.
Figure 7:
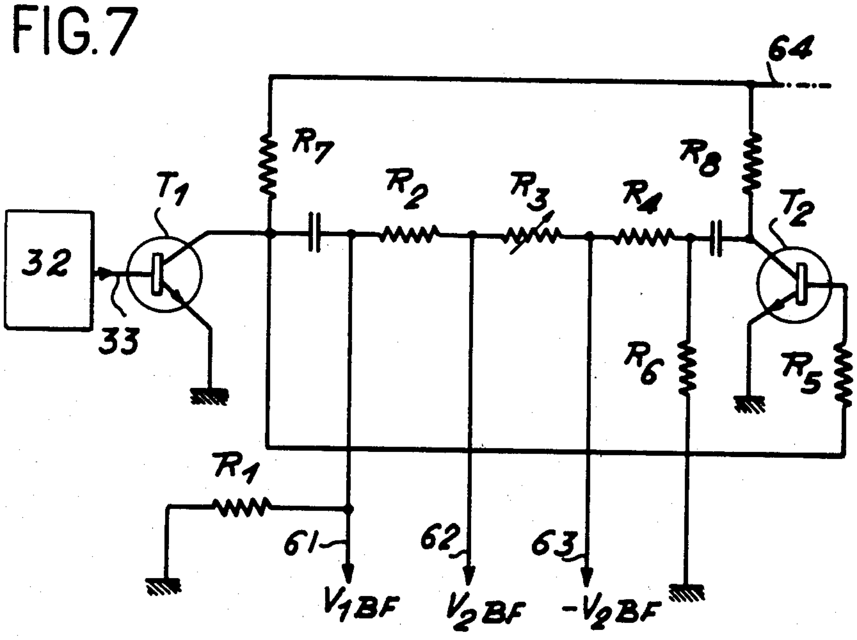
FIG. 7 is a diagram of an electronic circuit for delivering high-frequency voltages.
Figure 9:
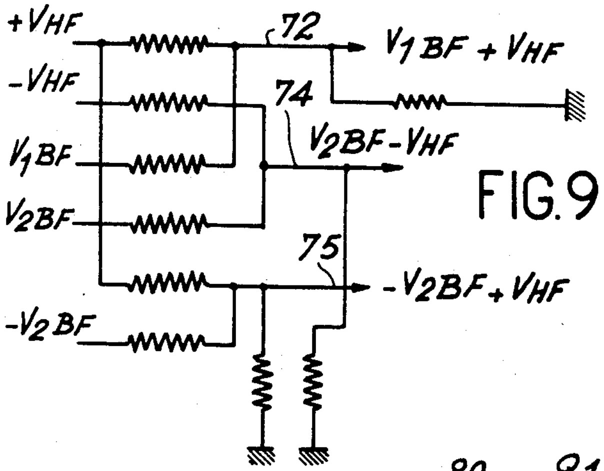
FIG. 9 is a diagram of an electronic circuit for superimposing the low-frequency and high-frequency voltages obtained by the means shown in FIGS. 7 and 8.

FIGS. 7, 8 and 9 show in detail the circuit 36 of FIG. 6 which makes it possible by means of the low-frequency and high-frequency voltages to produce said third set of voltages applied to the electrodes of the display cells.

FIG. 7 shows the electrical diagram of a circuit which makes it possible to obtain, by means of a low-frequency signal appearing on the lead 33 which corresponds to the output lead of the low-frequency generator 32, three low-frequency signals which appear on the leads 61, 62 and 63 and have RMS values $V_{1BF}$, $V_{2BF}$ and $-V_{2BF}$. In FIG. 7, the references $T_1$ and $T_2$ represent transistors and the references $R_1$, $R_2$, $R_3$, $R_4$, $R_5$, $R_6$, $R_7$ and $R_8$ represent resistors.

Adjustment of the voltage $V_{1BF}$ is carried out by adjusting the direct-current voltage derived from a polarizing supply (not shown) connected to the lead 64 and adjustment of the voltage $V_{2BF}$ is carried out by adjusting the resistor $R_3$.

FIG. 8 shows the electrical diagram of a circuit which makes it possible to obtain, by means of the high-frequency signal carried by the lead 35 corresponding to the output of the generator 34, two high-frequency signals which have an RMS value of $+V_{HF}$ and $-V_{HF}$ and appear on the output leads 66 and 68. In FIG. 8, the references $T_3$ and $T_4$ designate transistors, the reference $C_1$ and $C_2$ designate capacitors and the references $R_{10}$, $R_{11}$, $R_{13}$ and $R_{14}$ designate resistors.

In the circuit aforementioned, control of the voltage $V_{HF}$ is carried out by adjusting the voltage applied to the lead 70 by means of a direct-current polarizing supply (not shown in the figure).

The circuit of FIG. 8 therefore makes it possible to obtain a single high-frequency voltage since it is assumed in this case solely by way of explanation without any limitation being implied that the two high-frequency voltages $V_{1HF}$ and $V_{2HF}$ are equal to each other and equal to $V_{HF}$, which corresponds to one of the particular cases contemplated earlier.

The three low-frequency voltages obtained by means of the circuit of FIG. 7, namely $V_{1BF}$, $V_{2BF}$, $-V_{2BF}$ and the two high-frequency voltages $+V_{HF}$ and $-V_{HF}$ obtained by means of the circuit shown in FIG. 8 form respectively the first and the second sets of voltages from which a third set of composite voltages is obtained by means of a circuit, the diagram of which is given in FIG. 9.

This circuit comprises a set of resistors and makes it possible to obtain on the three output leads 72, 74 and 75, respectively the three composite voltages $(V_{1BF} + V_{HF})$, $(V_{2BF} - V_{HF})$ and $(-V_{2BF} + V_{HF})$.

The first voltage $V_{1BF} + V_{HF}$ is intended for the control of characters and is transmitted via the lead 40 of the circuit shown in FIG. 6. This voltage is applied sequentially to the characters by means of the interface circuit 44.

The composite voltages $(V_{2BF} - V_{HF})$ and $(-V_{2BF} + V_{HF})$ which are transmitted via the lead 38 of the circuit shown in FIG. 6 are intended for the control of the segments and applied to said segments by means of the interface circuit 42.

Figure 10:
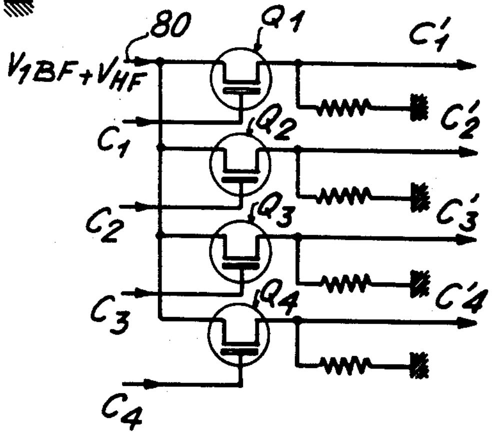
FIG. 10 is a diagram of a first interface circuit for controlling the characters of an imager.
Figure 11:
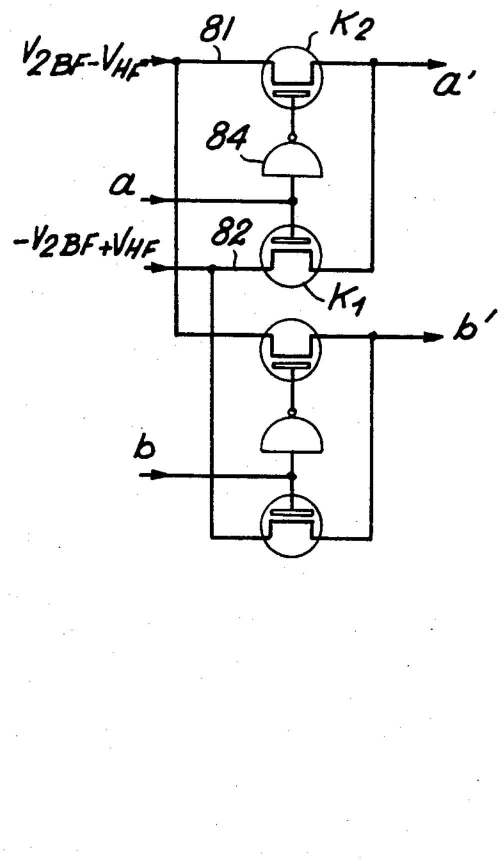
FIG. 11 is a diagram of a second interface circuit for controlling the segments of an imager.

The two interface circuits 42 and 44 of FIG. 6 are shown in greater detail in FIGS. 10 and 11.

In FIG. 10, the signal $V_{1BF} + V_{HF}$ is applied to the lead 80 and the sequential control signals are applied via the input leads $C_1$, $C_2$, $C_3$ and $C_4$ to the gates of the transistors $Q_1$, $Q_2$, $Q_3$ and $Q_4$. The composite voltage $V_{1BF} + V_{HF}$ therefore appears sequentially on the output leads $C'_1$, $C'_2$, $C'_3$ and $C'_4$.

In FIG. 11, the interface circuit which is illustrated has 7 identical stages each adapted to receive the voltage $V_{2BF} - V_{HF}$ via the lead 81 and the voltage $-V_{2BF} + V_{HF}$ via the lead 82. The control signal which appears on the input lead $a$ is applied to the gate of a first MOS transistor $K_1$ and, after being complemented by the inverter gate 84, is applied to the gate of a second MOS transistor $K_2$. Depending on the logical state of the signal applied at $a$, one of the two transistors $K_1$ and $K_2$ conducts and one of the two composite voltages appears on the output lead $a'$. This arrangement is repeated identically in the case of the control of the other segments.

The whole of the foregoing description relates to the control of a digital imager in which the optical state of the liquid crystal assumes only two values which have been designated symbolically by "0" or "1". It would clearly not constitute any departure from the scope of the invention to produce in this manner an intermediate optical state between these two states. In particular, when the phenomenon employed is that of molecular orientation under the action of an electric field, the state "0" can correspond to a white zone and the state "1" to a black zone and any grey level located between these two levels can be obtained by means of the method in accordance with the invention. It is possible for example to apply a set of low-frequency voltages and a set of high-frequency voltages of type A or B, the low-frequency or high-frequency voltages applied respectively to the lines and the columns being phase-displaced with respect to each other by a quantity $\phi$ in accordance with the method disclosed in patent Application No. EN 7403980 filed on Feb. 6th, 1974 by the present Applicant in respect of "A method for controlling an optical characteristic of a material and an analog imager for carrying out said method". The angle $\phi$ is then adjusted so as to obtain a grey level "$X$" comprised between 0 and 1 and the set of high-frequency voltages displays the level 0. The expressions of the function F introduced heretofore are modified so as to obtain the expression F (x) representing the excitation stored in a zone displayed as "$X$" by replacing the quantity $(V_{1BF} + V_{2BF})^2$ by the quantity $(V_{1BF} + V_{2BF})^2 - {}^{\Delta\phi/\pi}\, V_1\, V_2$ for example in relation (10) whilst the expression (11) which gives F (0) remains the same. It will then be necessary to take into account the high-frequency excitation in the low-frequency energy to be applied in order to obtain a predetermined grey level: the low-frequency energy must exceed a threshold value in order to overcome the high-frequency energy with a view to displaying the desired analog level.

We claim:

1. A method of sequential control of a liquid-crystal display cell comprising a liquid-crystal film interposed between a first group of electrodes and a second group of electrodes, overlapping of one electrode of the first group by one electrode of the second group defining an excitable zone of the liquid-crystal film, said liquid crystal having dielectric anisotropy and a critical frequency at which said dielectric anisotropy undergoes a change of sign, the value of anisotropy being $\epsilon_1$ below said critical frequency and $\epsilon_2$ above said critical frequency, said liquid-crystal assuming a first optical state "0" corresponding to a first orientation of its molecules when subjected to an alternating electric field at a low frequency below said critical frequency and assuming a second optical state "1" corresponding to a second orientation of its molecules when subjected to an alternating electric field at a high frequency above said critical frequency, the steps of applying on the electrodes of the first group which controls the point at which it is desired to effect the display a voltage at said low frequency having an RMS values of $V_{1BF}$ and a voltage at said high frequency having an RMS value of $V_{1HF}$ and a zero voltage on the other electrodes of the first group, applying on the electrodes of the second group which controls the points at which it is desired to effect the display a voltage at said low frequency having an RMS value of $V_{2BF}$ and a voltage at said high frequency having an RMS value of $V_{2HF}$, said RMS values being related by the inequality:

$$\epsilon_1 (V_{1BF} - V_{2BF})^2 < \epsilon_2 (V_{1HF} + V_{2HF})^2$$

in the zones in which the state "0" is to be displayed and related by the contrary inequality in the zones in which the state "1" is to be displayed.

2. A method of sequential control of a liquid-crystal display cell of the type consisting of a matrix of points defined by the overlapping of crossed strips disposed in $k$ columns in crossed relation with lines, said liquid-crystal having dielectric anisotropy and a critical frequency at which said dielectric anisotropy undergoes a change of sign, the value of anisotropy being $\epsilon_1$ below the critical frequency and $\epsilon_2$ above said critical frequency, said liquid-crystal assuming a first optical state "0" corresponding to a first orientation of its molecules when subjected to an alternating electric field at a low frequency below said critical frequency and assuming a second optical state "1" corresponding to a second orientation of its molecules when subjected to an alternating electric field at high frequency above said critical frequency, the steps of applying sequentially to the columns a voltage at said low frequency having an RMS value of $V_{1BF}$ and a voltage at said high frequency having an RMS value of $V_{1HF}$ and a zero voltage is applied to the other columns, applying a low-frequency voltage having an RMS value of $-V_{2BF}$ and a high-frequency voltage having an RMS value of $V_{2HF}$ to the lines corresponding to those points of the column at which it is desired to produce the state "0", applying a low-frequency voltage having an RMS value of $V_{2BF}$ and a high-frequency voltage having an RMS value of $-V_{2HF}$ to the lines corresponding to those points of the column at which it is desired to produce the state "1", adjusting the RMS values of the voltages to provide that the quantity $$\epsilon_1 (V_{1BF} - V_{2BF})^2 + (K - 1)\, \epsilon_1 (V_{2BF})^2$$

relating to the low-frequency signals is smaller than the quantity $$\epsilon_1 (V_{1HF} + V_{2HF})^2 + (K - 1)\, \epsilon_2 (V_{2HF})^2$$

relating to the high-frequency signals in respect of all points of the cell at which the state "1" is produced and to provide that this inequality is reversed in the case of all points of the cell at which the state "0" is produced.

3. A method according to claim 2, wherein there are applied voltages $V_{2BF}$ and $V_{2HF}$ which are related substantially by the relation:

$$\epsilon_1 {}^2_{2BF} = \epsilon_2 V^2_{2HF}$$

4. A method according to claim 2, wherein equal voltages $V_{1HF}$ and $V_{2HF}$ are applied.

5. A method of sequential control of a liquid crystal display cell of the type consisting of a matrix of points defined by the overlapping of crossed strips disposed in $k$ columns in crossed relation with lines, said liquid crystal having dielectric anisotropy undergoes a change of sign, the value of anisotropy being $\epsilon_1$ below the critical frequency and $\epsilon_2$ above said critical frequency, said liquid crystal assuming a first optical state "0" corresponding to a first orientation of its molecules when subjected to an alternating electric field at a low frequency below said critical frequency and assuming a second optical state "1" corresponding to a second orientation of its molecules when subjected to an alternating electric field at a high frequency above said critical frequency, the steps of applying a low-frequency voltage having an RMS value of $-V$ and a high-frequency voltage having an RMS value $$V\sqrt{\frac{\epsilon_1}{\epsilon_2}}$$

to the lines corresponding to those points of the column at which it is desired to produce the state "0", and applying a low-frequency voltage having an RMS value of $V$ and a high-frequency voltage having an RMS value $$V\sqrt{\frac{\epsilon_1}{\epsilon_2}}$$

to the lines corresponding to those points of the column at which it is desired to produce the state "1".

* * * * *